(12) United States Patent
Lamping et al.

(10) Patent No.: US 8,818,982 B1
(45) Date of Patent: Aug. 26, 2014

(54) DERIVING AND USING DOCUMENT AND SITE QUALITY SIGNALS FROM SEARCH QUERY STREAMS

(75) Inventors: John Lamping, Los Altos, CA (US); Mark Pearson, Berkeley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/456,054

(22) Filed: Apr. 25, 2012

Related U.S. Application Data

(63) Continuation of application No. 13/112,375, filed on May 20, 2011, now abandoned, which is a continuation of application No. 11/139,999, filed on May 31, 2005, now Pat. No. 7,962,462.

(51) Int. Cl.
*G06F 17/30* (2006.01)

(52) U.S. Cl.
CPC .............................. *G06F 17/30864* (2013.01)
USPC .......................................... 707/706; 707/707

(58) Field of Classification Search
None
See application file for complete search history.

(56) References Cited

U.S. PATENT DOCUMENTS

| | | | |
|---|---|---|---|
| 5,920,859 A | 7/1999 | Li | |
| 6,163,778 A | 12/2000 | Fogg et al. | |
| 6,285,999 B1 | 9/2001 | Page | |
| 6,463,426 B1 | 10/2002 | Lipson et al. | |
| 6,638,314 B1 * | 10/2003 | Meyerzon et al. | 715/234 |
| 6,658,423 B1 * | 12/2003 | Pugh et al. | 1/1 |
| 6,684,205 B1 | 1/2004 | Modha et al. | |
| 6,718,363 B1 | 4/2004 | Ponte | |
| 7,024,404 B1 | 4/2006 | Gerasoulis et al. | |
| 7,080,073 B1 | 7/2006 | Jiang et al. | |
| 7,216,123 B2 | 5/2007 | Kamvar et al. | |
| 7,231,399 B1 | 6/2007 | Bem et al. | |
| 7,260,573 B1 * | 8/2007 | Jeh et al. | 707/708 |
| 7,293,016 B1 | 11/2007 | Shakib et al. | |
| 7,739,281 B2 * | 6/2010 | Najork | 707/735 |
| 7,962,462 B1 | 6/2011 | Lamping et al. | |
| 8,423,541 B1 * | 4/2013 | Baluja et al. | 707/732 |
| 2001/0000356 A1 | 4/2001 | Woods | |
| 2002/0123988 A1 | 9/2002 | Dean et al. | |
| 2003/0063118 A1 | 4/2003 | Commons | |
| 2003/0093338 A1 | 5/2003 | Kim et al. | |
| 2004/0193584 A1 | 9/2004 | Ogawa et al. | |
| 2005/0033742 A1 | 2/2005 | Kamvar et al. | |
| 2005/0033803 A1 | 2/2005 | Vleet et al. | |
| 2005/0060290 A1 | 3/2005 | Herscovici et al. | |
| 2005/0060310 A1 | 3/2005 | Tong et al. | |
| 2005/0060312 A1 | 3/2005 | Curtiss et al. | |
| 2005/0071328 A1 | 3/2005 | Lawrence | |
| 2005/0154746 A1 | 7/2005 | Liu et al. | |
| 2005/0222989 A1 | 10/2005 | Haveliwala et al. | |
| 2005/0234881 A1 * | 10/2005 | Burago et al. | 707/3 |

(Continued)

OTHER PUBLICATIONS

"The PageRank Citation Ranking: Bringing Order to the Web", Jan. 29, 1998.*

(Continued)

*Primary Examiner* — Tarek Chbouki
(74) *Attorney, Agent, or Firm* — Harrity & Harrity, LLP

(57) ABSTRACT

A system analyzes one or more search streams to detect one or more associations between a document and one or more queries in the one or more search streams. The system further derives a value for the document based on the detected associations and uses the derived value in evaluating a quality of the document with respect to one or more subsequent queries.

18 Claims, 10 Drawing Sheets

(56) References Cited

U.S. PATENT DOCUMENTS

| | | |
|---|---|---|
| 2005/0240580 A1 | 10/2005 | Zamir et al. |
| 2006/0004628 A1 | 1/2006 | Axe et al. |
| 2006/0031195 A1 | 2/2006 | Patterson |
| 2006/0059144 A1 | 3/2006 | Canright et al. |
| 2006/0064411 A1* | 3/2006 | Gross et al. ............... 707/3 |
| 2006/0136098 A1 | 6/2006 | Chitrapura et al. |
| 2006/0149800 A1 | 7/2006 | Egnor et al. |
| 2006/0167842 A1 | 7/2006 | Watson |
| 2006/0230033 A1* | 10/2006 | Halevy et al. ............... 707/3 |
| 2006/0242178 A1 | 10/2006 | Butterfield et al. |
| 2006/0277175 A1 | 12/2006 | Jiang et al. |
| 2006/0287971 A1* | 12/2006 | Armstrong ............... 707/1 |
| 2007/0100874 A1* | 5/2007 | Balinsky et al. ............ 707/102 |
| 2007/0106659 A1* | 5/2007 | Lu et al. ............... 707/5 |
| 2007/0156677 A1 | 7/2007 | Szabo |
| 2008/0005090 A1 | 1/2008 | Khan et al. |
| 2008/0162425 A1 | 7/2008 | Grennan et al. |
| 2008/0306943 A1 | 12/2008 | Patterson |
| 2008/0319971 A1 | 12/2008 | Patterson |
| 2009/0234879 A1 | 9/2009 | Xie |

OTHER PUBLICATIONS

Page, "The PageRank Citation Ranking: Bringing Order to the Web," Jan. 29, 1998, pp. 1-17.

Eastman et al., "Coverage, relevance, and ranking: The impact of query operators on Web search engine results," Oct. 2003, ACM Press, pp. 383-411.

Haveliwala, "Link Analysis: Topic-sensitive PageRank," May 2002, ACM Press, pp. 517-526.

\* cited by examiner

US 8,818,982 B1

DERIVING AND USING DOCUMENT AND SITE QUALITY SIGNALS FROM SEARCH QUERY STREAMS

RELATED APPLICATIONS

This application is a continuation of U.S. application Ser. No. 13/112,375, filed May 20, 2011, which is a continuation of U.S. application Ser. No. 11/139,999, filed May 31, 2005, now U.S. Pat. No. 7,962,462. The entire disclosures of these applications are incorporated herein by reference.

BACKGROUND

1. Field of the Invention

Implementations described herein relate generally to information searching and, more particularly, to deriving and using document quality signals from search query streams.

2. Description of Related Art

Existing information searching systems use search queries to search through aggregated data to retrieve specific information that corresponds to the received search queries. Such information searching systems may search information based locally, or in distributed locations. The World Wide Web ("web") is one example of information in distributed locations. The web contains a vast amount of information, but locating a desired portion of that information can be challenging. This problem is compounded because the amount of information on the web, and the number of new users inexperienced at web searching, are growing rapidly.

Search engines attempt to return hyperlinks to web documents in which a user is interested. Generally, search engines base their determination of the user's interest on search terms (e.g., in a search query provided by the user). The goal of the search engine is to provide links to high quality, relevant results to the user based on the search query. Typically, the search engine accomplishes this by matching the terms in the search query to a corpus of pre-stored web documents. Web documents that contain the user's search terms are considered "hits" and are returned to the user.

To return the "best" results of a search, it is important to measure, in some fashion, the quality of documents, such as web documents. One existing document quality measurement technique calculates an Information Retrieval (IR) score that is a measure of how relevant a document is to a search query. The IR score can be weighted in various ways. For example, matches in a document's title might be weighted more than matches in a footer. Similarly, matches in text that is of larger font or bolded or italicized may be weighted more than matches in normal text. A document's IR score may be influenced in other ways. For example, a document matching all of the terms of the search query may receive a higher score than a document matching one of the terms. All of these factors can be combined in some manner to generate an IR score for a document that may be used in determining a quality of the results from an executed search.

Scores derived from an existing link-based document ranking algorithm may additionally be used in conjunction with IR scores. PageRank is one existing global, link-based document ranking algorithm that derives quality signals from the link structure of the web. Often, however, link structure may be unavailable, unreliable, or limited in scope, thus, limiting the value of using PageRank in ascertaining the relative quality of some documents.

SUMMARY OF THE INVENTION

According to one aspect consistent with the principles of the invention, a method may include analyzing one or more search streams to detect one or more associations between a document and one or more queries in the one or more search streams. The method may further include deriving a value for the document based on the detected associations and using the derived value in evaluating a quality of the document with respect to one or more subsequent queries.

According a further aspect, a method may include using a search query to return a set of search result documents and analyzing documents from the set of search result documents to identify a document having prominent text similar to text of the search query. The method may further include assigning a value to the identified document and using the assigned value as an indication of a quality of the identified document for subsequently performed searches.

According to another aspect, a method may include using a search query to return a set of search result documents and identifying links, from a corpus of documents, having text similar to text of the search query, where more of the identified links point to a particular document than to other documents in the set of search result documents. The method may further include assigning a value to the particular document and using the assigned value as an indication of a quality of the particular document for subsequently performed searches.

According to a further aspect, a method may include receiving a same, or similar, search query from multiple users and retrieving search result documents using the search query. The method may further include sending the search result documents to the users and receiving an indication of a selection of a same document from the search result documents from more of the multiple users than selected other documents of the search result documents. The method may also include assigning a value to the same document and using the assigned value as an indication of a quality of the same document for subsequently performed searches.

BRIEF DESCRIPTION OF THE DRAWINGS

The accompanying drawings, which are incorporated in and constitute a part of this specification, illustrate embodiments of the invention and, together with the description, explain the invention. In the drawings.

FIG. 5 is a diagram illustrating a comparison of prominent text in a document with a search query to determine if they are similar;

FIG. 6 is a diagram illustrating a comparison of text in links that point to a document with a search query to determine if they are similar;

DETAILED DESCRIPTION

The following detailed description of the invention refers to the accompanying drawings. The same reference numbers in different drawings may identify the same or similar elements. Also, the following detailed description does not limit the invention.

According to aspects of the invention, methods and systems are provided that determine a quality signal for a document, or corresponding site, based on whether search queries specifically "ask" for or request the document. Consistent with aspects of the invention, whenever users issue a search query for which they already have a desired document/site in mind, then issuance of the search query may be considered a strong "vote" for the quality of the document/site.

A "document," as the term is used herein, is to be broadly interpreted to include any machine-readable and machine-storable work product. A document may include an e-mail, a web site, a file, one or more digital images, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to or from a document.

Exemplary Overview

Figure 1:
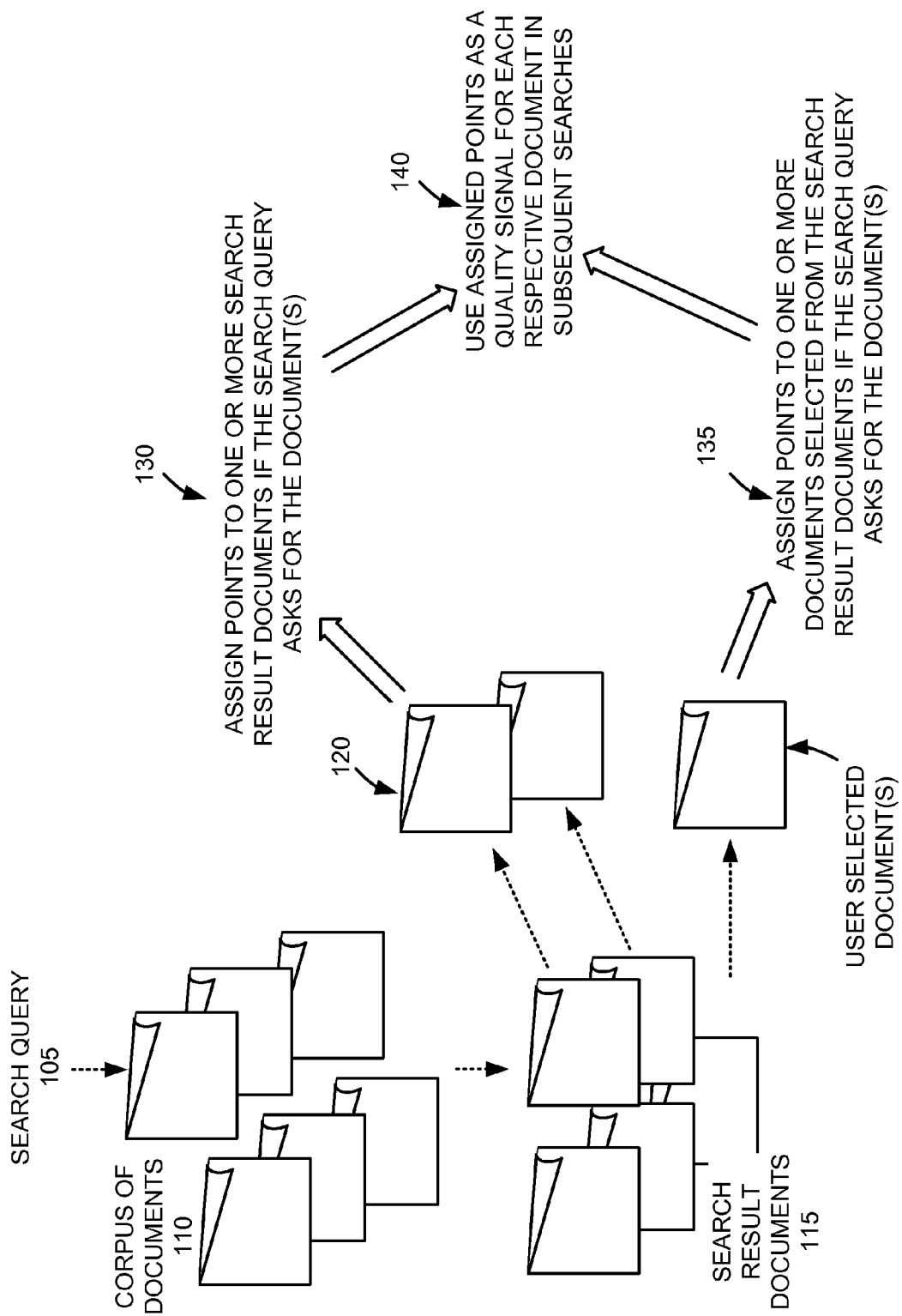
FIG. 1 is a diagram of an overview of an exemplary use of the invention.

FIG. 1 illustrates an overview of the determination and use of a quality signal to be associated with one or more documents. In accordance with this aspect of the invention, a search query, and, possibly, user selections from search results resulting from execution of the search query, may be analyzed to determine if the user was requesting a specific document or site from a corpus of documents or sites.

As shown in FIG. 1, a user may issue a search query 105 to a search engine. The search engine may search a corpus of documents 110, using existing searching techniques, based on search query 105. As a result of the search, the search engine may return indications (e.g., links and/or descriptions) of a set of search result documents 115 to the user who issued search query 105. Points may be assigned 130 by the search engine to one or more documents 120 of search result documents 115 if search query 105 is deemed to "ask" for the one or more specific documents 120. Search query 105 may be determined to "ask" for the one or more documents 120 if each of the documents has similar text (e.g., similar text in the title of the document, in prominent text in the document, or in a URL of the document) as compared to the text of the search query. Search query 105 may be determined to "ask" for the one or more documents 120 if more links (e.g., a majority) contained in other documents of the corpus of documents 110, having text that is similar to the text of the search query, point to the one or more documents 120 than to other documents in the search result documents 115.

In some implementations, the user may select one or more documents 125 from search result documents 115. Points may be assigned 135 by the search engine to the user selected document(s) 125 if search query 105 "asks" for the document(s). The search query 105 may be determined to "ask" for the document(s) 125 if many previous users who have issued this particular search query 105 selected document(s) 125 from a set of search result documents.

The points assigned to documents contained in the corpus of documents 110 may then be used 140 as a quality signal for each respective document for subsequent searches performed by a search engine. In one implementation, the assigned points may be used as a quality signal for all subsequent searches and, thus, may serve as a "global" quality signal for subsequent searches regardless of whether the subsequent searches include the same search query 105 that resulted in points being assigned to a specific document.

The assigned points may be used, for example, in any type of subsequently executed document scoring/ranking algorithm. In one implementation, the assigned points may be used as an input in a subsequent PageRank computation. In another implementation, a combination of the points assigned consistent with aspects of the invention and results of a PageRank computation may be used to derive a quality signal. This combination may either be mathematical (e.g., an average) or otherwise (e.g., using different signals at different places or times in a ranking/scoring algorithm). The points assigned, consistent with aspects of the invention, may generally be used as a signal of document quality, and can be used in many different ways in any scoring/ranking algorithm, or for deriving other quality signals that are used in a ranking/scoring algorithm.

Exemplary Network Configuration

Figure 2:
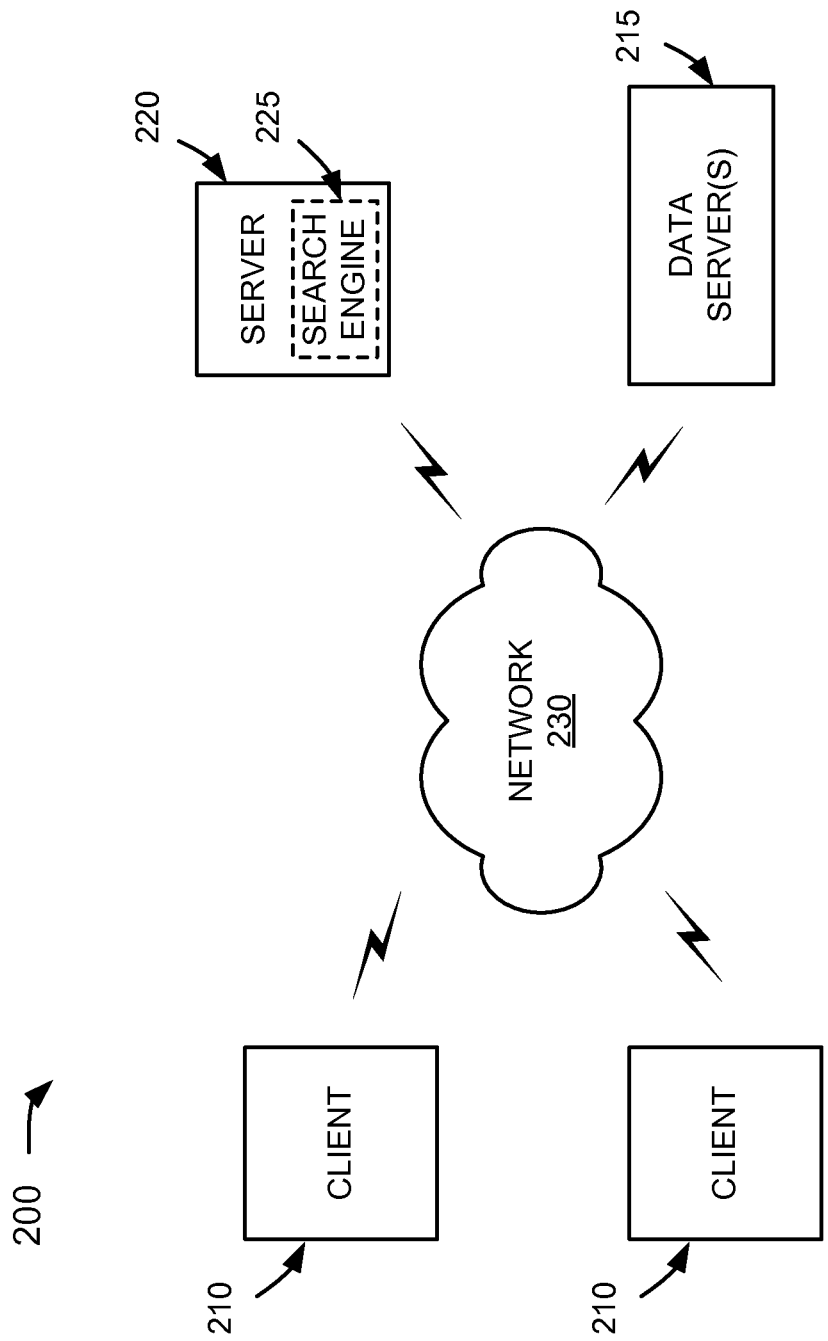
FIG. 2 is a diagram of an exemplary network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220 and 215 via a network 230. Network 230 may include a local area network (LAN), a wide area network (WAN), a telephone network, such as the Public Switched Telephone Network (PSTN), an intranet, the Internet, a memory device, or a combination of networks. Two clients 210 and two servers 220 and 215 have been illustrated as connected to network 230 for simplicity. In practice, there may be more or fewer clients and servers. Also, in some instances, a client may perform the functions of a server and a server may perform the functions of a client.

Clients 210 may include client entities. A client entity may be defined as a device, such as a wireless telephone, a personal computer, a personal digital assistant (PDA), a laptop, or another type of computation or communication device, a thread or process running on one of these devices, and/or an object executable by one of these devices. Servers 220 and 215 may include server entities that gather, process, search, and/or maintain documents in a manner consistent with the principles of the invention. Clients 210 and servers 220 and 215 may connect to network 230 via wired, wireless, and/or optical connections.

In an implementation consistent with the principles of the invention, server 220 may include a search engine 225 usable by users at clients 210. Server 220 may implement a data aggregation service by crawling a corpus of documents (e.g., web pages) hosted on data server(s) 215 and store information associated with these documents in a repository of crawled documents. The data aggregation service may be implemented in other ways, such as by agreement with the operator(s) of data server(s) 215 to distribute their hosted documents via the data aggregation service. Search engine 225 may execute a query, received from a user, on the corpus of documents hosted on data server(s) 215.

Server(s) 215 may store or maintain documents that may be crawled by server 220. Such documents may include data related to published news stories, products, images, user groups, geographic areas, or any other type of data. For example, server(s) 215 may store or maintain news stories from any type of news source, such as, for example, the Washington Post, the New York Times, Time magazine, or Newsweek. As another example, server(s) 215 may store or maintain data related to specific product data, such as product data provided by one or more product manufacturers. As yet another example, server(s) 215 may store or maintain data related to other types of web documents, such as pages of web sites.

While servers 220 and 215 are shown as separate entities, it may be possible for one or more of servers 220 and 215 to perform one or more of the functions of another one or more of servers 220 and 215. For example, it may be possible that two or more of servers 220 and 215 are implemented as a single server. It may also be possible for a single one of servers 220 or 215 to be implemented as two or more separate (and possibly distributed) devices.

Exemplary Client/Server Architecture

Figure 3:
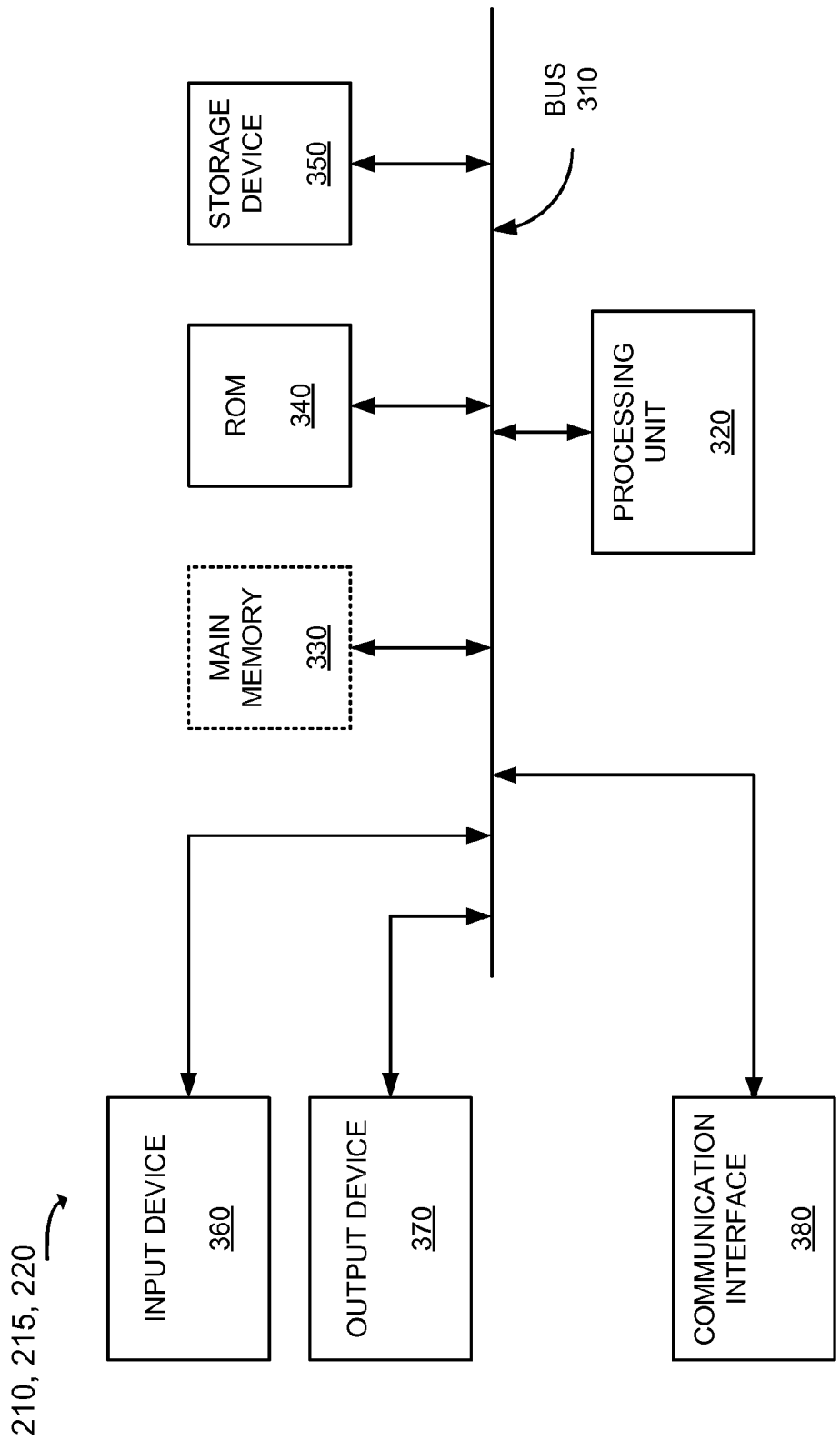
FIG. 3 is an exemplary diagram of a client and/or server of FIG. 2 in an implementation consistent with the principles of the invention.

FIG. 3 is an exemplary diagram of a client or server entity (hereinafter called "client/server entity"), which may correspond to one or more of clients 210 and servers 220 and 215, according to an implementation consistent with the principles of the invention. The client/server entity may include a bus 310, a processing unit 320, an optional main memory 330, a read only memory (ROM) 340, a storage device 350, an input device 360, an output device 370, and a communication interface 380. Bus 310 may include a path that permits communication among the components of the client/server entity.

Processing unit 320 may include any type of software, firmware or hardware implemented processing device, such as, a microprocessor, a field programmable gate array (FPGA), combinational logic, etc. Main memory 330 may include a random access memory (RAM) or another type of dynamic storage device that stores information and instructions for execution by processing unit 320, if processing unit 320 includes a microprocessor. ROM 340 may include a conventional ROM device or another type of static storage device that stores static information and/or instructions for use by processing unit 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or other biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 230.

As will be described in detail below, the client/server entity, consistent with the principles of the invention, may perform certain searching-related operations. The client/server entity may, in some implementations, perform these operations in response to processing unit 320 executing software instructions contained in a computer-readable medium, such as memory 330. A computer-readable medium may be defined as one or more physical or logical memory devices and/or carrier waves.

The software instructions may be read into memory 330 from another computer-readable medium, such as data storage device 350, or from another device via communication interface 380. The software instructions contained in memory 330 may cause processing unit 320 to perform processes that will be described later. Alternatively, hardwired circuitry may be used in place of, or in combination with, software instructions to implement processes consistent with the principles of the invention. Thus, implementations consistent with principles of the invention are not limited to any specific combination of hardware circuitry and software.

Exemplary Quality Signal Determination Process

Figure 4:
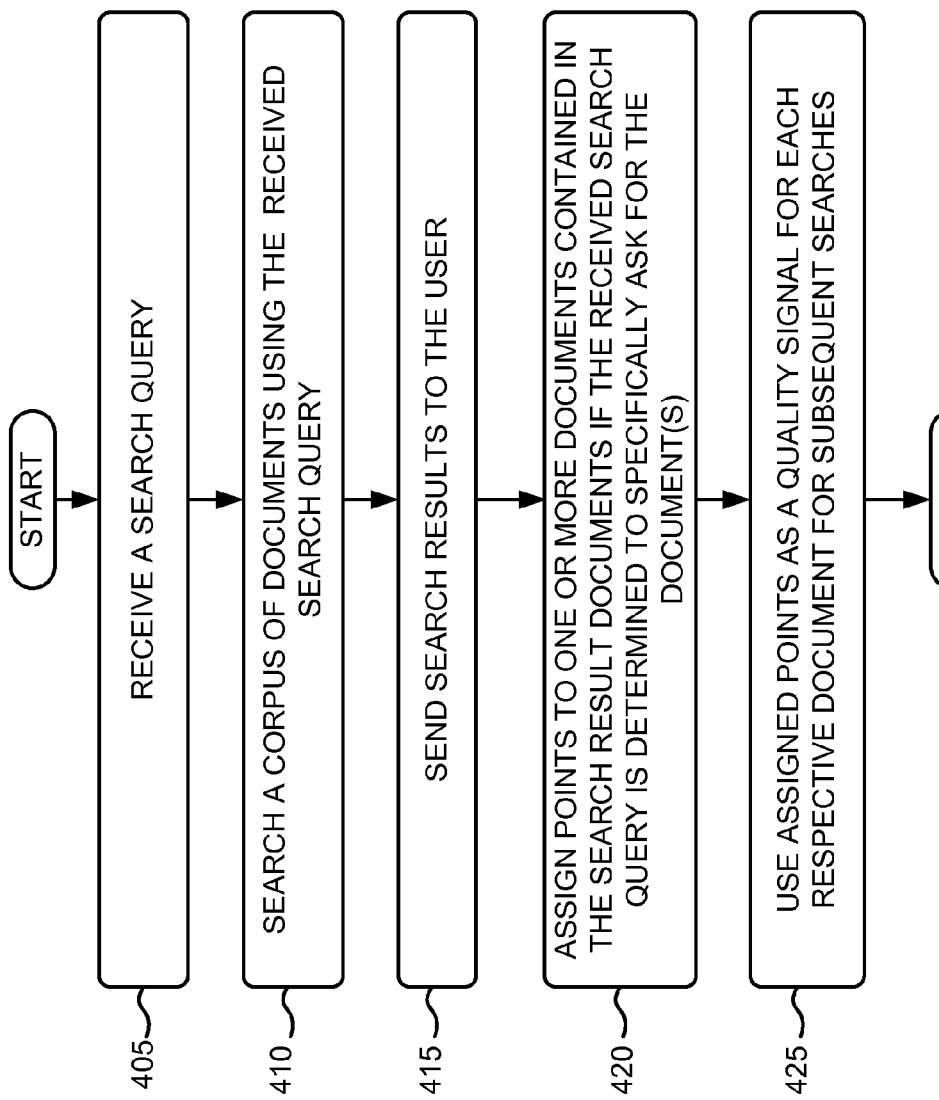
FIG. 4 is a flowchart of an exemplary process for assigning points to documents for use as a quality signal.

FIG. 4 is a flowchart of an exemplary process for determining a quality signal associated with documents from a corpus of documents consistent with principles of the invention. As one skilled in the art will appreciate, the process exemplified by FIG. 4 can be implemented in software and stored on a computer-readable memory, such as main memory 330, ROM 340 or storage device 350 of server 220. In other implementations, the processing exemplified by FIG. 4 can be implemented in hardwired circuitry, such as combinational logic, within processing unit 320 of server 220.

The exemplary process may begin with the receipt of a search query (act 405). Search engine 225 at server 220 may receive the search query from a user associated with a client 210. Alternatively, the search query may be retrieved from a log of previously issued user search queries. Search engine 225 may search a corpus of documents using the received search query (act 410) using existing searching techniques. Search engine 225 may then send the results of the search to the user who issued the search query (act 415). The results sent to the user may include indications (e.g., links and/or descriptions) of a set of search result documents that were returned as a result of the search of the corpus of documents.

Search engine 225 may assign points to one or more documents from the search results if the received search query is deemed to have "asked" for the document(s) (act 420). A user may thus "vote" in favor of the quality of the requested documents (i.e., the documents which the user is deemed to have asked for) through issuance of the search query. The number of points assigned to each document may be predetermined (e.g., one point), or may vary based on various factors. In some implementations, receipt of certain pre-designated search queries may result in no assignment of points to the one or more documents contained in the search result documents. Additionally, in other implementations, the assigned points may include negative points. For example, if it is known that users issuing a specific query are issuing it solely to attempt to amass points for a specific document, then points may be subtracted from points assigned to the document.

Figure 5:
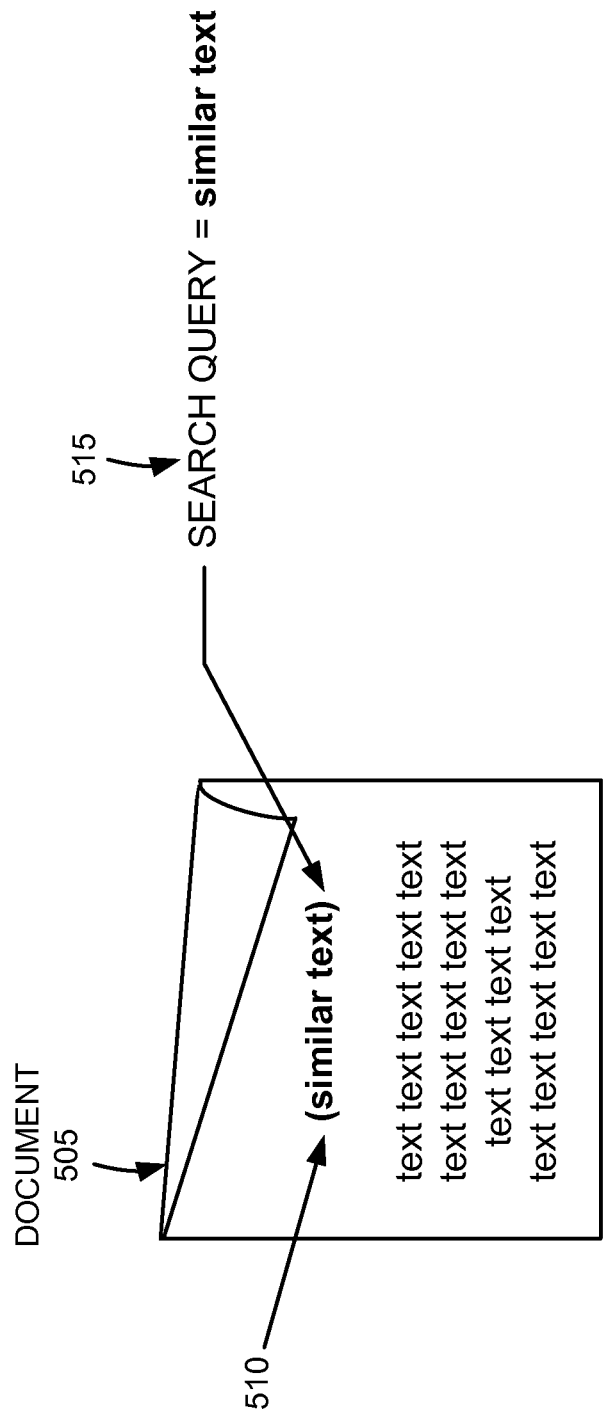

A number of techniques can be used to determine whether a given search query "asks" for one or more documents. For example, the received search query may be determined to "ask" for the one or more documents if each of the documents is analyzed and determined to have similar text (e.g., similar text in the title of the document, in prominent text in the document, or in the document's uniform resource locator (URL)) as compared to the text of the search query. As an illustrative example, FIG. 5 depicts a document 505, having a body of text 510 that includes prominent text (e.g., "similar text") that is similar to the text in a search query 515. Search query 515 may thus be considered to "ask" for document 505 based on the similar text 510 prominently featured in document 505. Text prominently featured in document 505 may include, for example, text in the document title, text that has a large font size, text in bold, text that includes all capital letters, or text positioned at certain locations in the document (e.g., at the top of the document).

As another example, the received search query may be determined to "ask" for the one or more documents if more links (e.g., a majority, or a preponderance, of links) contained in other documents of the corpus of documents, having text that is similar to the text of the search query, point to the one or more documents than to other documents of the search result documents. For example, assume that the queries [London Hotels] and [Ritz Carlton] are frequently issued by users. If a preponderance of links containing the text "Ritz Carlton" point to an official Ritz Carlton hotel document, it can be determined that users were asking for the official Ritz Carlton document. Whereas, if no document in the corpus of documents has a preponderance of links with the text "London Hotels" pointing to it, then it may be determined that users were not asking for any particular one of those documents, even though some of those documents might have more links pointing to it with the text "London Hotels" than the Ritz Carlton document had links pointing to it with the text "Ritz Carlton." In such a case, the official Ritz Carlton document may receive points from the query [Ritz Carlton], but no document may receive points from the query [London Hotels].

Figure 6:
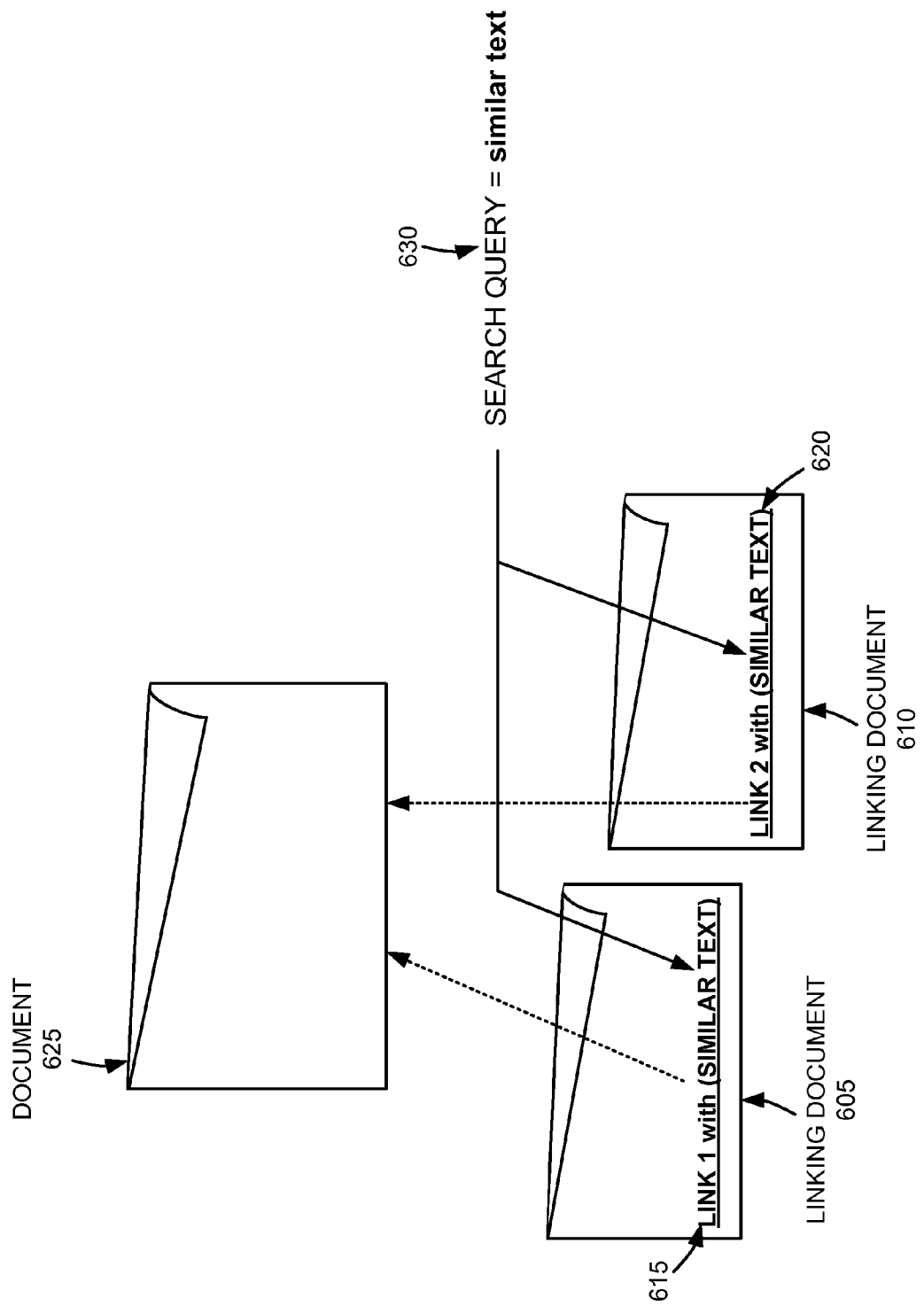

As an illustrative example, FIG. 6 depicts linking documents 605 and 610 that each have links 615 and 620, respectively. Link 615 points to document 625 and has text (i.e., anchor text) that is similar to the text of search query 630, and link 620 points to document 625 and has text that is similar to the text of search query 630. Search query 630 may, thus, be considered to "ask" for document 625 based on the similar text contained in links 615 and 620 pointing to document 625. In one implementation, a threshold number of links (e.g., greater than 20 links), with similar text to the search query, that points to the one or more documents may be required before determining that the search query "asks" for the one or more documents. In another implementation, a majority of links, having similar text to the search query, that point to the one or more documents may be required before determining that the search query "ask" for the one or more documents.

Figure 7:
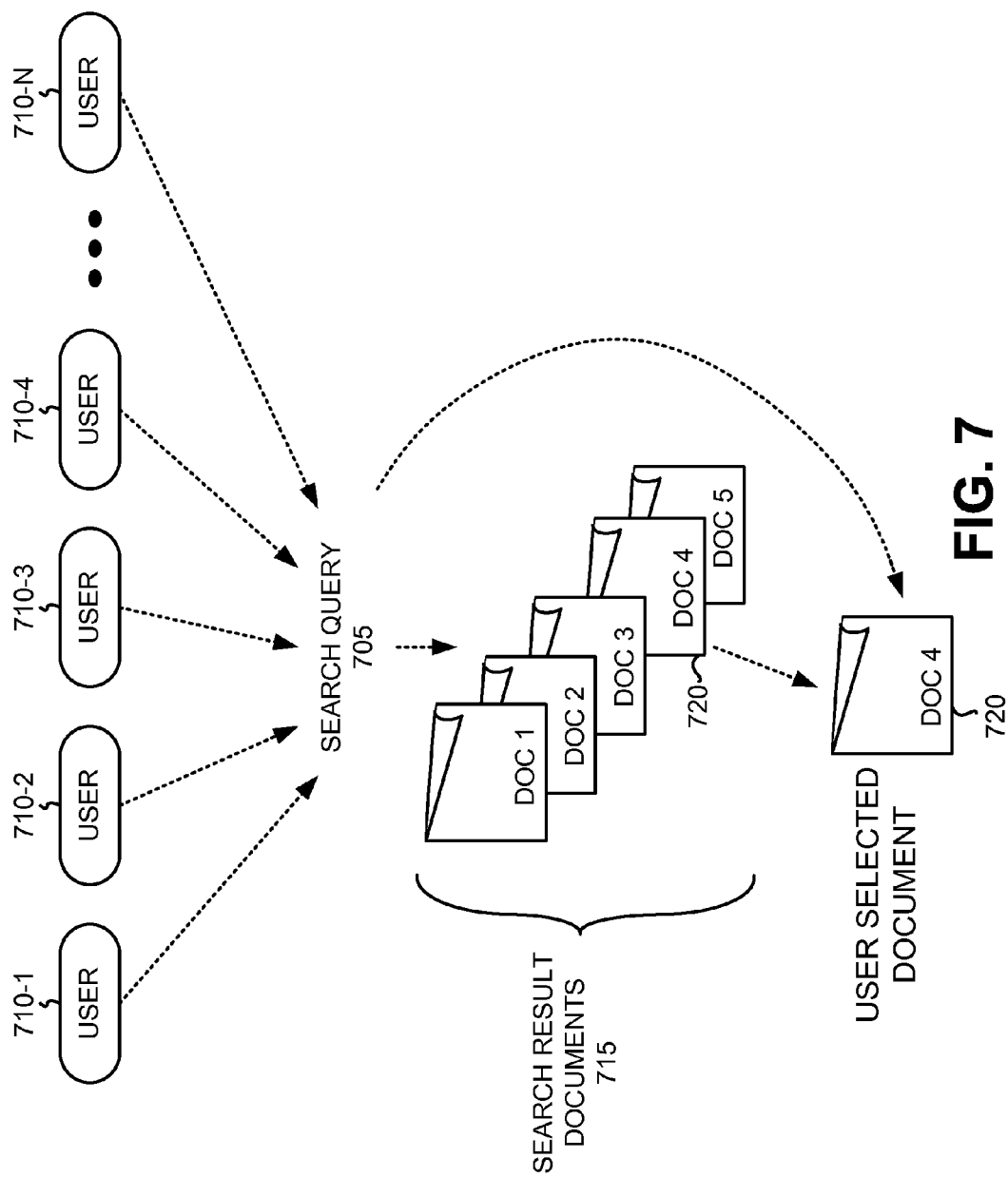
FIG. 7 is a diagram illustrating the selection of a same document from a set of search result documents by multiple users who have issued the same, or similar, search query to a search engine.

A user selection(s) from the search result documents, sent in act 415, may be received by server 220. For example, a user at client 210 who received an indication of the search results from server 220 may select (e.g., "click" on a link) of one or more search result documents. As a third example, the received search query may then be determined to "ask" for the one or more documents if the user selects the one or more documents from the set of result documents and many previous users (e.g., a specified minimum number, specified percentage, or preponderance, of users) who have issued the same, or similar, search query, selected those documents as well. As an illustrative example, FIG. 7 depicts the issuance of a same, or similar, search query 705 by N users 710-1 through 710-N. A search engine (not shown) retrieves one or more search result documents 715 from a corpus of documents using conventional searching techniques based on search query 705. Indications of the search result documents 715 may be sent to each of users 710, and each user 710 may "select" a document 720 from the search result documents 715. As shown in FIG. 7, each user 710 has selected the same document 720 from search result documents 715, thus, effectively indicating that each user 710 has asked for document 720 by issuing search query 705.

If an analysis of all instances of a given query (e.g., query 705), from many users, indicates that no one search result document was selected most of the time (e.g., at least 51 of 100 selections by users from search result documents), then it can be determined that the users were not "asking" for a specific document by issuing a same search query. For example, assume that the query [London Hotels] is issued by users very frequently and the query [Ritz Carlton] is issued by users less frequently. However, over all the search queries for [London Hotels] issued by many users, not a single search result garners a majority of selections by the users. This, thus, suggests that there was no one particular document that the users were "asking" for when they issued search query [London Hotels]. So even though certain documents in the search results from the query [London Hotels] received many user selections, those documents may not be assigned any points for the search query [London Hotels] (though some of these documents may be assigned points for other search queries). For the query [Ritz Carlton], however, the official Ritz Carlton document may receive a vast majority of all user selections and may thus be assigned points as the document for which the users were "asking," despite receiving fewer user total selections than for many of the search result documents resulting from the search query [London Hotels].

The points assigned to respective documents may be used as a quality signal in subsequently performed searches (act 425). The subsequently performed searches may be performed by search engine 225, or by other search engines. In one implementation, the assigned points may be used as a quality signal for all subsequent searches, thus, serving as a "global" quality signal for subsequent searches regardless of whether the searches include the same search query that resulted in points being assigned to a specific document. A document that has been assigned points in act 430 may, therefore, get a "boost" (e.g., be scored/ranked higher) for other search queries that match the content of the document. Acts 405-430 may be repeated for each search query received from a user at a client 210.

The points assigned in act 425 above can be limited, or modified, in a number of ways. For example, the number of points that can be assigned to a document from the receipt of a same query may be limited (e.g., no more than 50 points for the search query "xxxxx"), the number of points due to issuance of search queries from a single user may be limited (e.g., a maximum of 100 points for a single user, assuming 1 point assigned per search query), the number of points a user can give a particular document may be limited (e.g., no more than 20 points for document X from user Y), or the number of points due to issuance of search queries from a same Internet Protocol (IP) address may be limited (e.g., no more than 30 points from IP address mmmm.nnnn.oooo.pppp). Any of the above ways for limiting, or otherwise modifying, assigned points may be limited by time (e.g., no more than 50 points for the search query "xxxx" during one day, no more than 20 points for document X from user Y during a week). Any, or all of, the above-described point assignment, modification or limitation, techniques may be combined in multiple different ways, and a mathematical function may be used to compute a quality signal for a given document.

Exemplary Implementations

Figure 8:
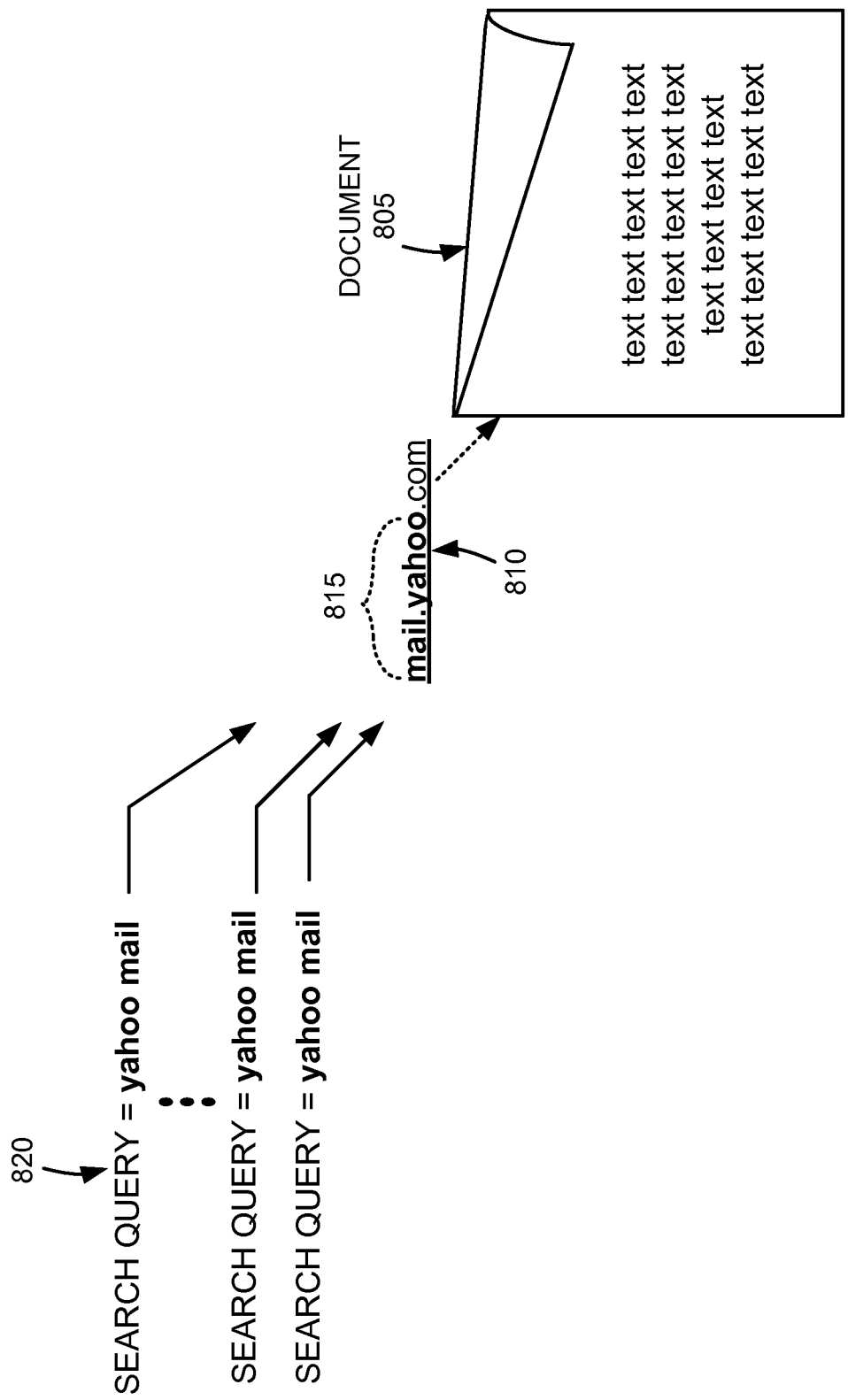
FIGS. 8-10 illustrate exemplary implementations for determining whether search queries "ask" specifically for a document by name.

FIG. 8 illustrates an exemplary implementation in which similarity between text in a URL 810 associated with a document 805 and multiple, similar search queries 820 is used to determine whether the search queries 820 are asking for a document 805 by name. FIG. 8 depicts document 805 having a URL 810 "mail.yahoo.com." A portion 815 of text of URL 810 is similar to the text contained in each of the multiple search queries 820, which all have search terms "yahoo" and "mail." Based on the similarity between the text in URL 810 and each of the search queries 820, a determination can be made, consistent with one aspect of the invention, that search queries 820 are each "asking" for document 805.

Figure 9:
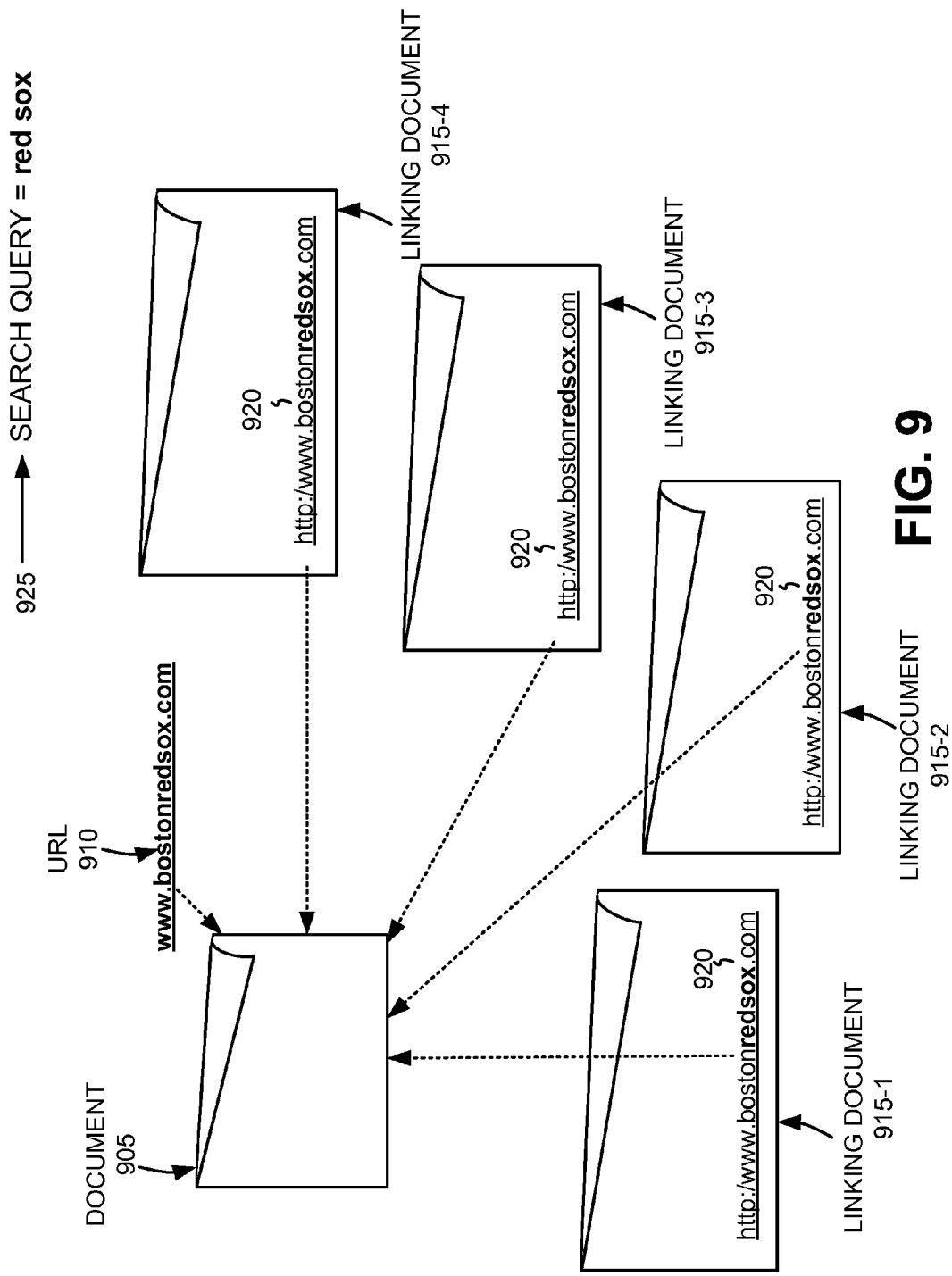

FIG. 9 illustrates a further exemplary implementation in which similarity between text, contained in links, more of which point to a document in a set of search results than to other documents in the set of search results, and a search query is used to determine whether the search query is asking for a document. As illustrated in FIG. 9, a document 905 may have a URL 910 "www.bostonredsox.com." Four link documents 915-1 through 915-4 may each include a link, pointing to document 905, that include similar text (e.g., "red sox") to a search query 925. Based on the number of links in documents 915 pointing to document 905 (with no links to other documents in the set of search result documents), and having similar text to the search query, a determination can be made, consistent with an aspect of the invention, that search query 925 is "asking" for document 905 by name.

Figure 10:
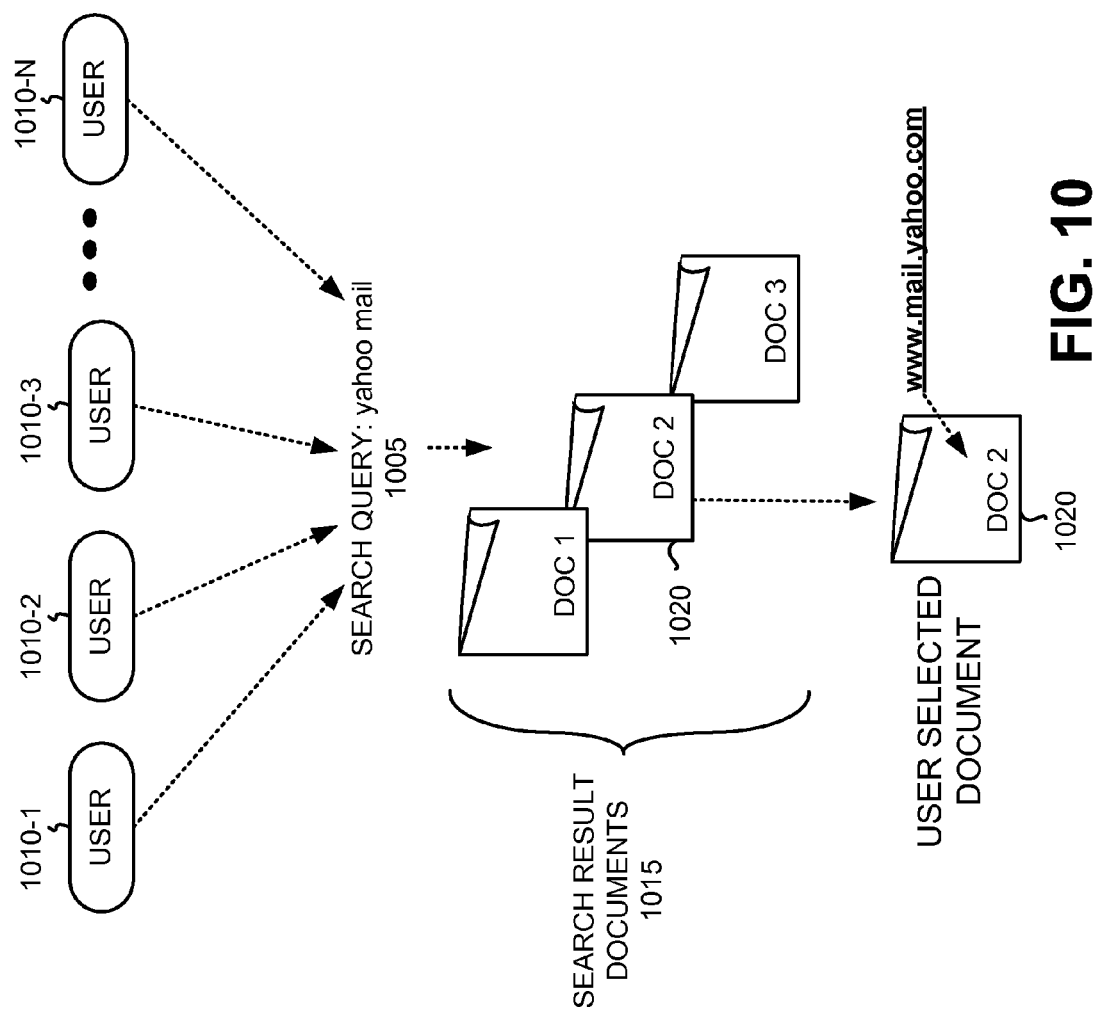

FIG. 10 illustrates another exemplary implementation in which it is determined that a document is effectively "asked" for when many users (e.g., a majority, or preponderance, of users) who issue a search query select the same document from a set of search results. FIG. 10 depicts the issuance of a same, or similar, search query 1005 ("yahoo mail") by N users 1010-1 through 1010-N. A search engine (not shown) retrieves one or more search result documents 1015 from a corpus of documents using conventional searching techniques based on search query 1005. Indications of the search result documents 1015 may be sent to each of the users 1010, and a set of users 1010 "select" a same document 1020 ("www.mail.yahoo.com") from search result documents 1015. Since a set of users 1010 have selected the same document 1020 from search result documents 1015, search query 1005 is effectively "asking" for document 1020. Other users (not shown) issuing search query 1005 may select different documents from search result documents 1015, as long as the number of user selections of document 1020 is sufficiently high (e.g., a majority) as compared to user selections of the other different documents. In one implementation, the selection of a same document 1020 by a set of users 1010 in response to issuance of a same, or similar, search query 1005 may be used to increase a quality score associated with document 1020. Thus, even if subsequent users issue a different search query than search query 1005 (e.g., "web mail"), then document 1020 may be ranked higher in the resulting search results due to this increased quality score.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 4, the order of the acts may be modified in other implementations consistent with the principles of the invention. Additionally, non-dependent acts may be performed in parallel.

While aspects of the invention have been described as assigning points to documents for use as a quality signal, points may additionally, or alternatively, be assigned to a "site" that hosts the various documents. Such sites may include a group of documents under common control, such as a group of documents associated with an organization, a domain name, a host name, or a set of documents created by the same person or group of persons. A "site" may also include a group of documents about a topic, a group of documents in a particular language, a group of documents hosted in a particular country, or a group of documents written in a particular writing style. In all of these variations involving a "site," a point assigned to a document becomes a vote for the site with which the document is associated. In other aspects, quality signals may be derived at a combination of levels (e.g., document, various "site" levels) and combining them in some manner, such as, for example, during scoring/ranking of the documents.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

Further, certain portions of the invention have been described as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable memory device storing instructions, the instructions comprising:
   one or more instructions which, when executed by at least one processor, cause the at least one processor to:
      receive a same search query from a plurality of client devices;
      identify a plurality of search result documents based on the search query;
      provide information regarding the plurality of search result documents to the plurality of client devices;
      receive information regarding selections, of the information regarding the plurality of search result documents, at the plurality of client devices in connection with the search query;
      determine that a particular quantity of the selections, for information regarding a particular search result document of the plurality of search result documents, is greater than a quantity of the selections for information regarding one or more other search result documents of the plurality of search result documents;
      assign a value to the particular search result document based on determining that the particular quantity of the selections is greater than the quantity of the selections for the information regarding the one or more other search result documents,
         the value, assigned to the particular search result document, being based on:
            a particular period of time, or
            a respective network address associated with one or more of the plurality of client devices; and
      use the value as a measure of quality for the particular search result document for a subsequently received search query that is associated with the search query.

2. The non-transitory computer-readable memory device of claim 1, where the value, assigned to the particular search result document, is limited for each client device of the plurality of client devices.

3. The non-transitory computer-readable memory device of claim 1, where the particular quantity of the selections includes a percentage.

4. The non-transitory computer-readable memory device of claim 1, where the one or more instructions which cause the at least one processor to use the value as the measure of quality comprise:
 one or more instructions which, when executed by the at least one processor, cause the at least one processor to use the value as one factor of a plurality of factors to determine the measure of quality for the particular search result document for the subsequently received search query.

5. The non-transitory computer-readable memory device of claim 1, where the one or more instructions which cause the at least one processor to assign the value to the particular search result document comprise:
 one or more instructions which, when executed by the at least one processor, cause the at least one processor to assign the value to one or more sites associated with the particular search result document.

6. The non-transitory computer-readable memory device of claim 1, where the one or more instructions to use the value as the measure of quality for the particular search result document include:
 one or more instructions which, when executed by the at least one processor, cause the at least one processor to rank the particular search result document higher than another search result document, in a subsequently performed document scoring or ranking algorithm, based on the assigned value being higher than a value assigned to the other search result document.

7. The non-transitory computer-readable memory device of claim 1, where the particular quantity of the selections corresponds to a majority of the selections.

8. A system comprising:
 an interface to receive a search query from a plurality of client devices; and
 a processing unit, implemented at least partially in hardware, to:
  identify a plurality of search result documents based on a search query,
  provide information regarding the plurality of search result documents to the plurality of client devices,
  receive information regarding selections, of the information regarding the plurality of search result documents, at the plurality of client devices in connection with the search query,
  determine that a particular quantity of the selections, for information regarding a particular search result document of the plurality of search result documents, is greater than a quantity of the selections for information regarding one or more other search result documents of the plurality of search result documents,
  assign a value to the particular search result document based on determining that the particular quantity of the selections, for the information regarding the particular search result document, is greater than the quantity of the selections for the information regarding the one or more other search result documents,
   the value, assigned to the particular search result document, being based on:
    a particular period of time, and
    a respective network address associated with one or more of the plurality of client devices, and
  use the assigned value as a measure of quality for the particular search result document for a subsequent search,
   the subsequent search being associated with the search query.

9. The system of claim 8, where, when using the assigned value as the measure of quality for the particular search result document for the subsequent search, the processing unit is to:
 rank the particular search result document higher than another search result document in a subsequently performed document scoring or ranking algorithm based on the assigned value being higher than a value assigned to the other search result document.

10. The system of claim 8, where, when assigning the value to the particular search result document, the processing unit is further to:
 assign the value to one or more sites associated with the particular search result document.

11. The system of claim 8, where the particular quantity of the selections corresponds to a majority of the selections.

12. The system of claim 8, where, when using the assigned value as the measure of quality for the particular search result document for the subsequent search, the processing unit is to:
 use the value as one factor of a plurality of factors to determine the measure of quality for the particular search result document for the subsequent search.

13. A method comprising:
 receiving, at one or more processors, a same search query from a plurality of client devices;
 identifying, by the one or more processors, search result documents based on the search query;
 providing, by the one or more processors, information regarding the search result documents to the plurality of client devices;
 receiving, at the one or more processors, information regarding selections, of the information regarding the search result documents, at the plurality of client devices in connection with the search query;
 determining, by the one or more processors, that a particular quantity of the selections, for information regarding a particular search result document of the search result documents, is greater than a quantity of the selections for information regarding one or more other search result documents of the search result documents;
 assigning, by the one or more processors, a value to the particular search result document based on determining that the particular quantity of the selections, for the information regarding the particular search result document, is greater than the quantity of the selections for the information regarding the one or more other search result documents,
  the value, assigned to the particular search result document, being based on at least one of:
   a particular period of time, or
   a respective network address associated with one or more of the plurality of client devices; and
 using, by the one or more processors, the value as a measure of quality for the particular search result document for a subsequently received search query that is associated with the search query.

14. The method of claim 13, where the particular quantity of the selections includes a percentage.

15. The method of claim 13, where using the value as the measure of quality includes:
   using the value as one factor of a plurality of factors to determine the measure of quality for the particular search result document for the subsequently received search query.

16. The method of claim 13, where assigning the value to the particular search result document includes:
   assigning the value to one or more sites associated with the particular search result document.

17. The method of claim 13, where using the value as the measure of quality for the particular search result document includes:
   ranking the particular search result document higher than another search result document, in a subsequently performed document scoring or ranking algorithm, based on the assigned value being higher than a value assigned to the other search result document.

18. The method of claim 13, where the particular quantity of the selections corresponds to a majority of the selections.

* * * * *